United States Patent [19]

Lemelson

[11] 4,200,227
[45] Apr. 29, 1980

[54] KEY ASSEMBLY FOR ELECTRONIC SYSTEM

[76] Inventor: Jerome H. Lemelson, 85 Rector St., Metuchen, N.J. 08840

[21] Appl. No.: 973,527

[22] Filed: Dec. 26, 1978

[51] Int. Cl.$^2$ .................. G06K 5/00; G06K 19/06; E05B 35/00
[52] U.S. Cl. .................. 235/382; 235/488; 70/336
[58] Field of Search .............. 235/382, 488, 487, 494; 340/280; 70/336, 344, 413

[56] References Cited

U.S. PATENT DOCUMENTS

| | | | |
|---|---|---|---|
| 3,093,994 | 6/1963 | Richard | 235/382 |
| 4,120,452 | 10/1978 | Kimura et al. | 235/487 |
| 4,142,674 | 3/1979 | Walton | 235/487 |

*Primary Examiner*—Daryl W. Cook

[57] ABSTRACT

A key assembly is provided which includes a support and retainer for a coded electrical circuit which is responsive to short wave radiation for use in security systems which employ the key to open a lock or close a switch for controlling a machine or gaining access to a locked container or room. In one form, a plastic housing surrounds the head of the key and supports or contains an electrical circuit means which is operable for generating a coded short wave signal or affecting an energy field in a coded manner to enable the operation of a machine or motor vehicle. Two or more plastic components are shaped and constructed to not only hold and retain various electrical circuits but also to allow their simple and rapid assembly against and around the head of a key. Retention means for the plastic assembly in the form of ultrasonic welding, fusion bonding, solvent bonding or other means is provided for rapid and easy assembly of the key and electronic circuit. In one form, such assembly is easily disassembleable while in another form, an attempt to disassemble such assembly results in destruction of the electronic circuit so that it may not be easily duplicated or copied.

6 Claims, 3 Drawing Figures

KEY ASSEMBLY FOR ELECTRONIC SYSTEM

SUMMARY OF THE INVENTION

This invention relates to new and improved structures in key assemblies, particularly involving coded electrical circuits as part of such assembly or assemblies for enabling the opening of a lock by electrical means and/or the operation of a motor such as the starting motor of a motor vehicle. The invention is particularly applicable to an electronic security system associated with a motor vehicle wherein either the gasoline engine driving such vehicle may not be started or one or more electric motors operating such vehicle may not be connected to a source of electrical energy if the coded means associated with the key is not present when the key is turned in its switch receptacle as set forth in co-pending application Ser. No. 858,669.

In said application Ser. No. 858,669 there is provided an electronic security system for preventing the theft of a motor vehicle or the operation of a machine unless a coded member is present in the vicinity of a detection means simultaneously as a key is turned in a key receptacle. In one form of said invention, the coded means comprises a card containing an electronic circuit or a plurality of coded antennai disposed on a card, chip or other means held by the person attempting to operate a lock or switch with the key. The instant invention provides the electronic circuit or coded antenna in a housing which is supported by and assembled with the head of the key, a most convenient location for such circuit which assures that it will be present in the vicinity of the detection means for the code defined by the circuit each time the key is inserted into its receptacle, such as an ignition switch of a motor vehicle.

Accordingly, it is a primary object of this invention to provide a new and improved lock or switch key and an assembly including an electronic circuit for use with such key in operating a control system or a motorized lock.

Another object is to provide a housing for an electronic circuit which is adapted to be assembled with the head of a key.

Another object is to provide an electronic circuit and a housing therefor assembleable with a lock or a switch key in a simple and rapid manner.

Another object is to provide an assembly of an electronic circuit and a key for use in operating a switch or a lock wherein, if access is attempted to determine the nature of the circuit by dissassembling the assembly, such circuit will be at least partially destroyed.

Another object is to provide a housing for rapidly securing and retaining an electronic circuit in assembly with a lock or switch key.

Another object is to provide an assembly including a switch or lock key and a plastic housing containing an microminiature electronic circuit or circuits secured therein or attached thereto in a manner such that if tampering of the circuit is effected, it will be partly destroyed or rendered incapable of being analyzed or altered.

Another object is to provide a key and a retainer for an electrical circuit which retainer is attachable to the head of the key wherein assembly of the key and retainer is simple and easy to effect by even unskilled persons.

Another object is to provide a key assembly including a housing for holding a microminiature circuit in assembly with the key, wherein different microminiature circuits may be assembled with such retainers and respective keys without difficulty and the assembly or the retainer may be sealed around a portion of the key.

Another object is to provide a key assembly including a retainer for an electrical circuit assembleable with the head of the key wherein the electrical circuit is sealed within the retainer from water vapor and atmospheric corrosion.

With the above and other such objects in view as may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed:

Figure 1:
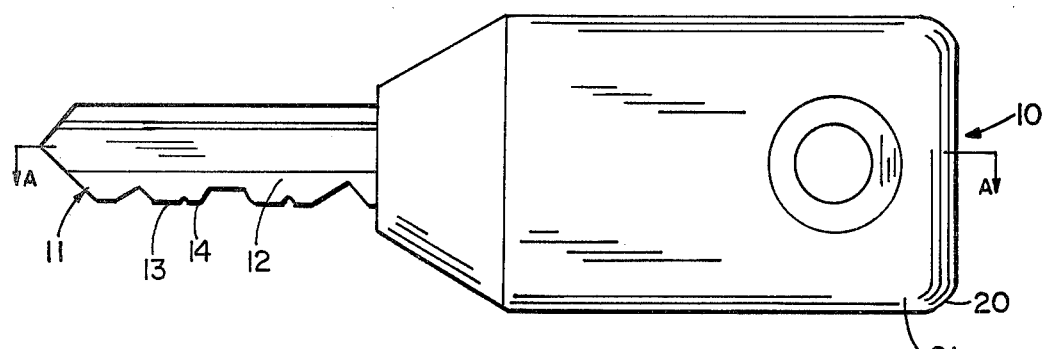
FIG. 1 is a side view of a key and housing assembly for use in an electronic control system.
Figures 2, 3:
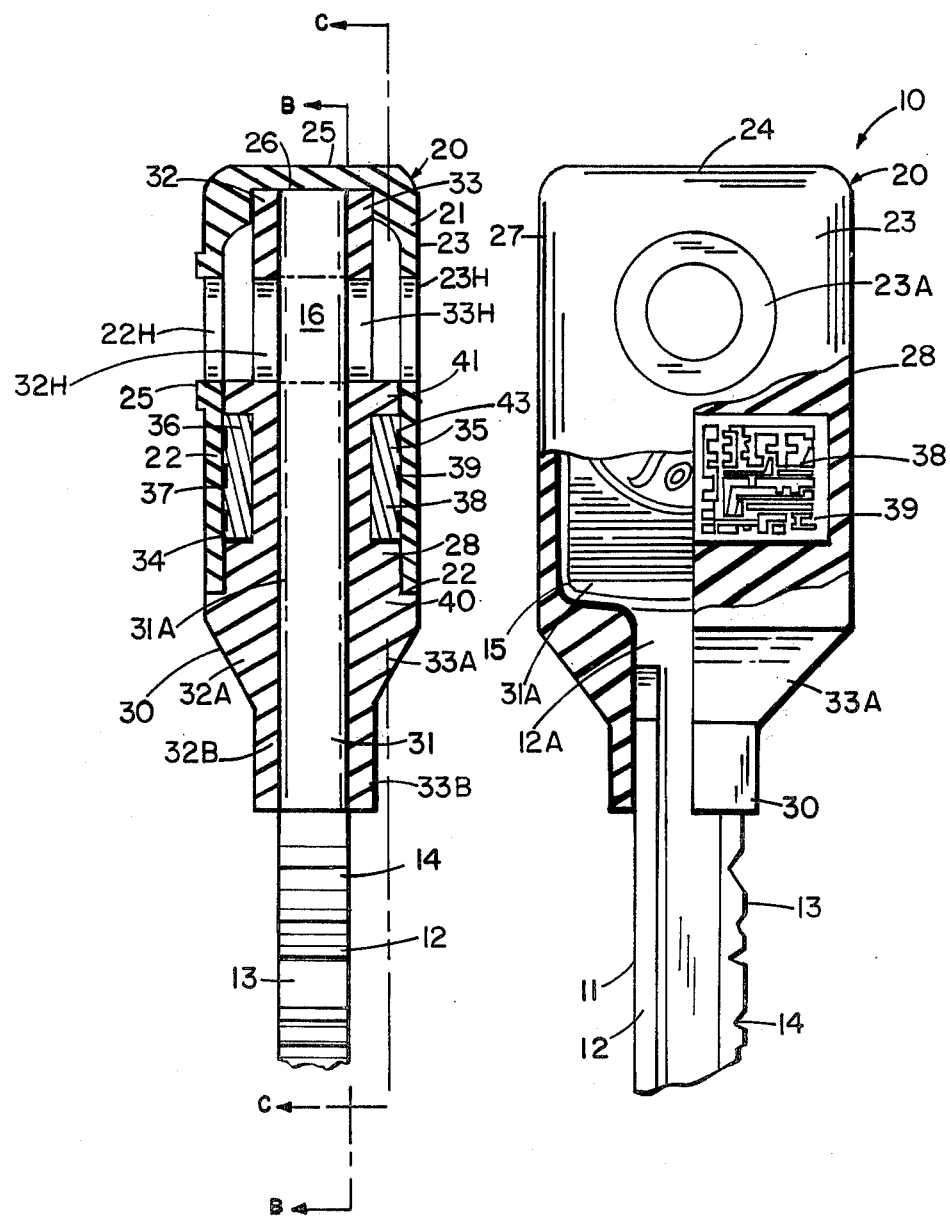
FIG. 2 is a cross-sectional view of the housing assembly of FIG. 1 taken along the plane denoted A—A.
FIG. 3 is a side view of the key assembly of FIG. 1 with portions of the housing broken away for clarity, along planes B—B and C—C.

In FIGS. 1 to 3 is shown a key assembly 10 including a metal key 11, such as an automobile ignition key or a key employed to operate a lock for a room or vault door. The key 11 is formed with a key head 15 extending to a blade portion 12 having an edge portion 13 thereof containing teeth or serrations 14 shaped to permit the turning of the key within the key receptacle of a lock or ignition switch to permit suitable operation of same. The head 15 of the key and a portion of the blade 12 beyond the operating serrations 14 thereof is shown retained within a housing 20 formed of two sections 21 and 30 which are preferably molded of a suitable rigid plastic resin such as high density polyethylene, polypropylene, polyamide, polyimide, acetyl, polycarbonate or other suitable resin which will remain relatively stable in a range of ambient temperatures to which the assembly is to be subjected and will not absorb moisture.

Housing section 21 is in the shape of an open elongated container having a circumscribing side wall, the lower rim 22 of which is sealed in assembly with a stepped portion of housing section 30 as illustrated in FIG. 2. Housing section 30 is an elongated molding containing a passageway 31 extending completely therethrough permitting the blade 12 of the key 11 to be passed into and through the passageway from the open upper end thereof so as to permit the head 15 of the key to seat within the upper portion 31A of the opening 31 as illustrated at the left in the cross-sectional view of FIG. 3. When the key 11 is fully inserted and its head seated against the inwardly stepped portion of the passageway 31 as shown in FIG. 3, the upper end of the head 15 of the key 11 is disposed below or at the open upper end of housing section 31. When the key is in such position within the housing section 30, the upper portion of the housing section is inserted into the open lower end of the housing section 21 until the upper end 32 thereof seats within a recess 26 formed in the inside surface of the end wall 25 of the outer housing section 21 as shown in FIG. 2. The engaging surfaces of the housing sections 21 and 30 preferably define a frictional fit and may be sealed together by means of solvent bonding, adhesive means applied therebetween, welding or ultrasonic sealing means to be described.

The head portion 15 of the key 11 has a conventional hole 16 extending therethrough through which a key ring or chain may be inserted to hold the key in assembly with a key holder. Aligned holes 22H, 23H, 32H and 33H are provided in the side walls 22 and 23 of housing section 21 and the side walls 32 and 33 of housing section 30.

The lower ends of the side walls 32 and 33 of housing section 30 contain inwardly tapered portions 32A and 33A which extend to necked down portions 32B and 33B and defining wall portions of the assembled housing which frictionally engage the upper portion of the blade 12 of the key.

The mid portion of housing section 30 is provided with two recesses or cavities denoted 34 and 35 formed in the side walls 32 and 33 thereof. Such recesses define respective storage volumes in which one or more microminiature electronic circuit members or chips denoted 36 and 38 are disposed. Chip 36 contains electronic circuit components 37 while chip 38 contains other electronic components 39 which components are either arranged in circuit arrays for either generating and transmitting by short wave coded electrical signals, or predeterminately affecting a short wave radiation field generated in the vicinity of the lock or switch in which the key blade is inserted when the key is turned therein, as set forth in my copening patent application Serial No. 858,669. In other words, either or both the volumes defined by cavities 34 and 35 may contain one or more electronic circuits which will either generate short wave code signals when energized by a short wave energy field in the vicinity of the key or which will cause predetermined variations in an energy field which may be detected by suitable detection means in the vicinity of said field thus permitting the key assembly 10 to be utilized in two manners, one to effect the turning of a rotatable portion of a lock or switch activating means and the other to predeterminately vary an energy field or generate a code signal which may be detected for cooperating with the mechanical operation of the key in completing a circuit between a source of electrical energy and an electrical device enabling the operation of an electric motor such as the starting motor of an automobile.

Notation 40 refers to a shelf formed in the upper portion of the tapered lower portion of the housing member 30 against which shelf the rim 22 of the housing member 21 may be forced and sealed upon assembly of the housing sections. As indicated above, the interface between the rim 22 of the molding 21 and the surface or surfaces of the stepped portion of the housing molding 30 are preferably sealed by adhesive, solvent bonding or welding means provided, for example, by means of heat sealing or ultrasonic welding electrodes.

Notation 41 refers to a circumscribing portion of the midsection of the housing section 30 which is above the cavities 34 and 35 and which has a circumscribing outer surface which engages the inner surface of the side walls of the housing section 21 wherein such engaging surfaces are also preferably sealed, bonded or welded together wherein such sealing circumscribes the cavities 34 and 35 so as to hermetically seal off such cavities and prevent moisture from entering the sealed volumes and detrimentally affecting the electronic circuit elements 37 and 39 disposed on the chips 36 and 38 provided therein.

For many applications, it will be necessary to provide only one microminiature electronic circuit, miniature antenna or coded array of antennae on a single chip. Accordingly providion need only be made for one of the cavities 34 and 35 to be formed between assembled components wherein the other side wall of the molding defining housing section 30 may be solid and void of a cavity.

The housing sections 21 and 30 are preferably injection molded of a suitable thermoplastic resin such as an acetyl, polycarbonate, polyamide, polyimide, rigid polyvinyl-chloride, cellulose acetate butyrate or other resin which is capable of being heat sealed, electronically sealed, ultrasonically sealed or otherwise welded to itself along the portions of the assembly of such components which abut each other so as to provide a hermetic seal for the circuits disposed within the cavities 34 and 35.

In a preferred form of the invention, the plastic housing components 21 and 30 are also bonded to the key head and shank during the sealing operation to improve the assembly and prevent dissassembly without destroying the housing and the circuit elements supported and encapsulated therein. The enlarged key head 15 will of course ordinarily prevent dissassembly of the key and housing 20 but if an enlarged head is not employed, then one or more holes in the head or cavities therein may receive material of the housing flowed therein during assembly by suitable heated dies applied to the assembly to retain the housing in assembly with the key.

In yet another embodiment of the invention, the microminiature circuit 38 may be encapsulated within a button-like housing which is bonded or mechanically held in assembly with the key head preferably by extending through a hole therein and being sealed to another such button on the other side of the head. Such button-like housing may extend through the conventional key hole in the head of the key or may be otherwise disposed and cemented or sealed to the key head.

I claim:

1. A key assembly for use in an electrical system comprising in combination:
   a manually operable key having a head portion and a shank portion shaped to permit the turning of said key in a lock receptacle,
   a housing assembled to the head portion of said key, and
   electrical coding means including a plurality of electrical circuit elements supported within said housing away from the surface of said key.

2. A key assembly in accordance with claim 1 wherein said housing is formed of at least two components assembled and sealed together against said key and said electrical coding means is secured to one of said components.

3. A key assembly in accordance with claim 2 wherein said electrical coding means is sealed against one of said components.

4. A key assembly in accordance with claim 3 wherein one of said components of said housing engages a major portion of the head of said key, said electrical circuit coding means being disposed against the outer surface of said one component, and another of said components of said housing is assembled to and surrounds said one component encasing said electrical circuit means therebetween.

5. A key assembly in accordance with claim 4 wherein said housing components are fabricated of a thermoplastic resin and are welded to each other in a manner to hermetically seal said electrical circuit means therebetween.

6. A key assembly in accordance with claim 4 wherein said housing components are produced of an ultrasonically weldable plastic resin and are ultrasonically welded to each other in a manner to hermetically seal said electrical circuit means therebetween.

* * * * *